July 13, 1965   F. STRIEPE   3,194,612
ROLLER GUIDE

Filed July 30, 1962   3 Sheets-Sheet 1

Inventor:

by: Albert M Zalkind

July 13, 1965    F. STRIEPE    3,194,612
ROLLER GUIDE

Filed July 30, 1962    3 Sheets-Sheet 2

United States Patent Office 3,194,612
Patented July 13, 1965

3,194,612
ROLLER GUIDE
Friedrich Striepe, Friedrichshafen, Germany, assignor to Zahnradfabrik Friedrichshafen Aktiengesellschaft, Friedrichshafen, Germany
Filed July 30, 1962, Ser. No. 213,389
Claims priority, application Germany, Aug. 18, 1961, 8,918
8 Claims. (Cl. 308—6)

This invention relates to guide ways for heavy machine parts which are required to be translatable, and more particularly, for a roller bearing type of guide way for movable machine beds or tables.

The art of supporting slidable or translatable machine elements is, of course, not new. However, prior art constructions using prismatic guide rails and rollers with crossed axes as heretofore known have certain drawbacks. For example, transverse force exerted by the rollers causes heavy wear in the guide rails and accordingly, such prior art construction is not suitable for heavy machine parts. Further, prior art constructions have been difficult to disassemble.

It is an object of the invention to overcome the drawbacks of prior structures by providing a continuously rotating train of rollers which are rotative around a fixed element in a continuous rolling path. Further, it is an object to provide a co-action between a guided rail and trains of rollers in such a manner as to minimize the wear on the contacting parts. It is another object of the invention to provide an arrangement wherein close adjustment may be had between relatively moving elements such as the guided rail and the supporting rollers, or roller base. It is a still further object of the invention to provide a construction which may be very readily disassembled. It is an even further object of the invention to provide a construction which may be very cheaply manufactured.

Briefly, the invention comprises the provision of two continuous roller trains in the same vertical plane, and so arranged that a rail secured to a movable machine part is disposed between the lower flight of an upper train of rollers and the upper flight of a lower train of rollers. The rail is rectangularly shaped so that it has upper and lower flat surfaces contacting substantially flat surfaces of the contiguous rollers. Each train of rollers is comprised of a series of links locked together to form a continuous or endless band of rollers. The links also serve as cages for the rollers. Various modifications herein disclose arrangements for effecting such construction, as will be described in detail in conjunction with the appended drawing, in which:

Figure 1:
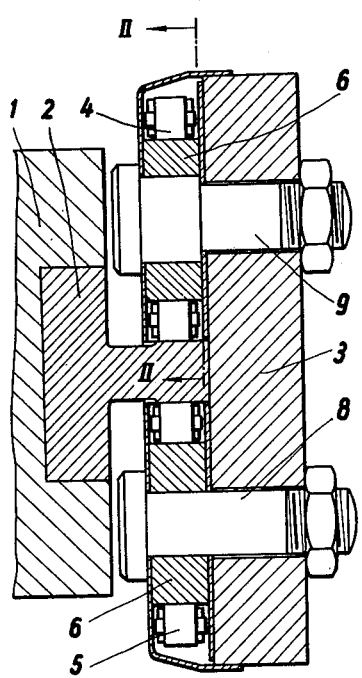
FIG. 1 is a fragmentary elevation in cross section showing how a guided rail is supported between two continuous roller trains.
Figure 2:
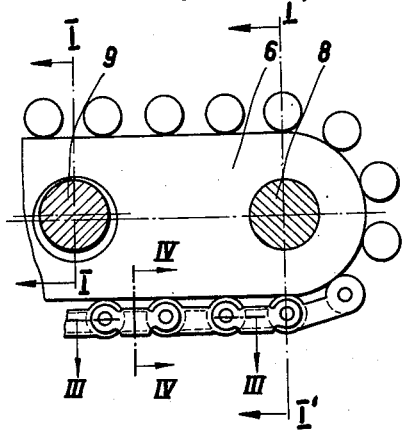
FIG. 2 is a view through II—II of FIG. 1.
Figure 4:
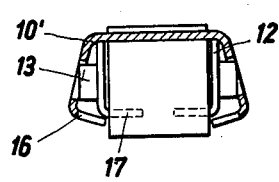
FIG. 4 is a view through IV—IV of FIG. 2, one of the links being shown distorted to illustrate the mode of assembly.
Figure 3:
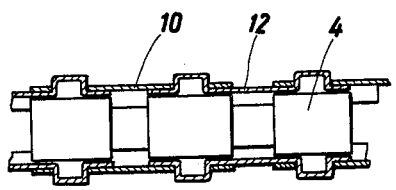
FIG. 3 is a view in section through III—III of FIG. 2.
Figures 5, 6:
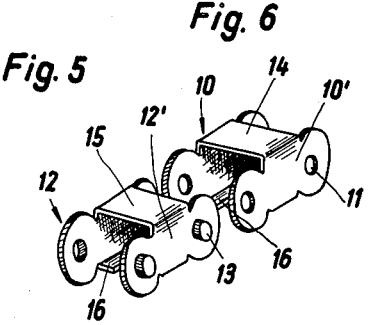
FIGS. 5 and 6 are juxtaposed perspective views of co-acting links.
Figure 7:
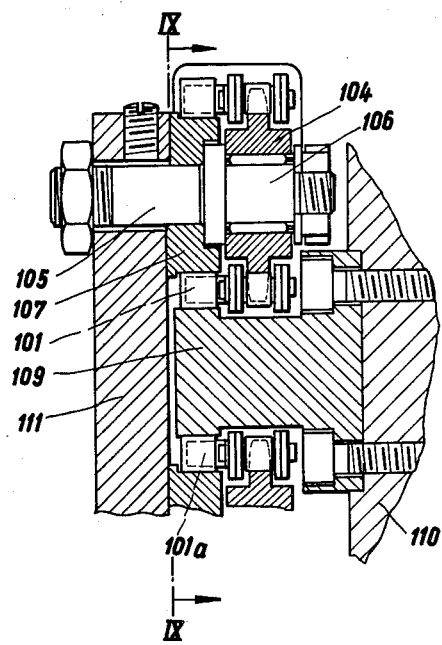
FIG. 7 is a cross sectional fragmentary view of a modified form of the invention, the view taken on the line VII—VII of FIG. 9.
Figure 8:
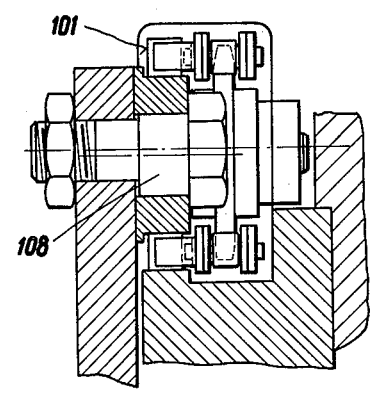
FIG. 8 is a cross sectional view taken on the line VIII—VIII of FIG. 9.
Figure 9:
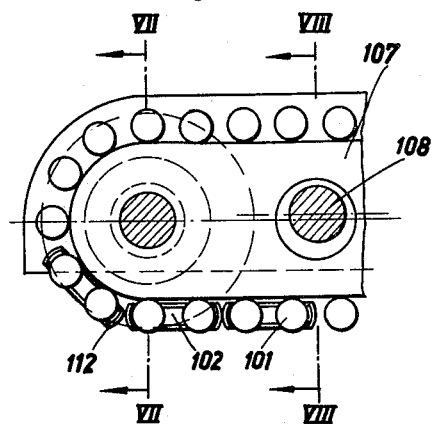
FIG. 9 is a view taken on the line IX—IX of FIG. 7.
Figure 10:
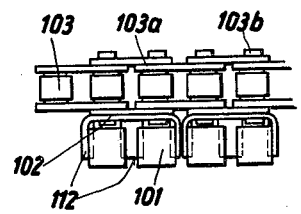
FIG. 10 is a plan view showing the arrangement of the train links relative to a chain link assembly of rollers which co-act with a roller wheel as shown in the other views.
Figure 12:
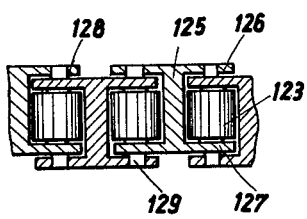
FIG. 12 is a section through XII—XII of FIG. 11.
Figure 11:
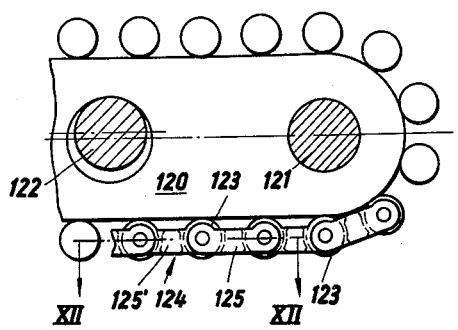
FIG. 11 is a fragmentary elevation of another form of the invention having a different type of link construction.

Referring now to FIGS. 1 through 6, the invention comprises a machine table 1 which is to be guided in translational movement and has for that purpose a rail 2 of generally rectangular T-shape formation, the lower portion or stem of which is flattened to ride between two trains or rollers, such as an upper train of rollers 4 and a lower train of rollers 5. Each train is carried on a roller shoe 6; each shoe is bolted as by bolts 8 and 9 to a fixed wall 3 of the machine. The bolt 9 is an eccentric bolt which may be rotated for the purpose of adjusting angularity of its shoe with respect to the other shoe, so as to effect proper parallelism of the roller trains. It will be apparent that both shoes may be thus provided with eccentrically adjustable bolts for this purpose at either or both ends. The bolt heads engage respective upper and lower housings which effect retention of the roller trains.

In order to disassemble the construction, it is only necessary to remove the bolts 8 and 9 of the upper shoe 6, thus permitting removal of the respective housing and the shoe. Subsequently, the table 1 and its rail 2 may be lifted off.

The specific construction of the roller chains comprises sheet steel telescopic links such as 10 and 12, as shown in FIGS. 3 through 6. Thus, the link 10 comprises side walls such as 10' having apertures 11 and an integral cross piece or bridge 14. The link 12 is essentially of the same general construction, except that it is provided with trunions 13 which can pass through apertures 11. Thus, the links 12 have side walls 12' spaced apart by an integral bridging member 15 which is somewhat less in transverse length than the bridging members 14, so that each link 12 may be telescoped at its ends within a link 10. Both links are provided with bendable flanges such as 16 secured to the longitudinal edges of the link walls.

In order to assemble the train, the walls of links 10 may be flexed outwardly from each other and the walls of links 12 flexed inwardly, to bring the trunnions 13 into apertures 11. At this time the rollers are inserted and the flanges 16 may be bent into the position shown to retain the rollers, in conjunction with elements 14, 15.

It will be noted that the rollers have no shafts and are thus retained in the cage-like links by the flanges 16, each link pair having a roller retained therebetween.

Referring now to the form of the invention shown in FIGS. 7 through 10, a chain of rollers 103 is carrier between flat links 103a to form a link chain around spaced sprocket wheels 104. Bolts 105 pass through machine wall 111 to secure shoe 107, having bearing ends 106 for journaling the sprocket wheels. Eccentric bolts 108 provide adjustability for the shoe.

It will be understood that the construction contemplates upper and lower chains of rollers 103 which are substantially identical, as described above.

The rollers 103 have shafts 103b extending far enough to be secured to links 102, each of which retains a pair of rollers such as 101 which serve as the guide rollers for the rail 109 of a machine table 110. The rollers 101 are retained in pairs having parallel axes between the transversely extending flanges 112 of the guide links 102, which guide links also have intermediate transversely extending flanges 112 on their longitudinal edges, intermediate the respective rollers but disposed below the circumferential area of contact between the rollers and their respective shoes, as well as between the rollers and the upper or lower surface of the rail 109 which they contact. Accordingly, the machine table is rollable between the two trains of rollers 101 and 101a, the rollers 101 preventing the moving table from separating from its bed and the rollers 101a supporting the weight of the table.

From the above description, it will be apparent that the rollers 101 and 101a are similar to the rollers 4 and 5 of the previously described modification, in that they are retained in parallel pairs within links or cages which are articulated to each other. In the present instance, however, the articulation of the links 102 is effected by having the links carried by the chain links 103a by means of which have the elongated shafts 103b, there being two such shafts for supporting each link 102.

Referring now to the form of the invention shown in FIGS. 11 through 14, the construction or arrangement of the roller trains and the shoes is similar to that heretofore described in that a continuous train of rollers 123 is carried on a shoe 120, which shoe may be secured as by a bolt 121 and an eccentric adjusting bolt 122 at each end of the shoe to a machine wall, which wall is not shown. In the particular arrangement, the train links 124 may be of synthetic material such as molded plastic and are all identical. Thus, the links have side walls such as 126 and 127 with a bridging member 125 therebetween. The wall 126 is provided with apertures such as 128 and the wall 127 is provided with trunnions 129.

Figure 13:
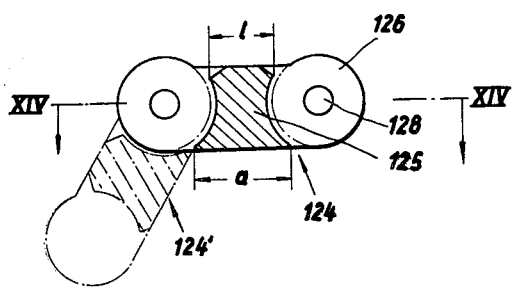
FIG. 13 illustrates a pair of links in position for assembly with respective rollers and is a cross section through XIII—XIII of FIG. 14.
Figure 14:
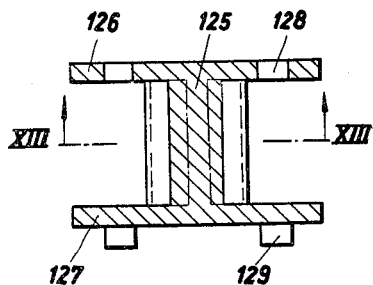
FIG. 14 is a section through XIV—XIV of FIG. 13.

As seen on FIG. 13, the bridging wall 125 is shaped so that the upper portion "i" is of less dimension than the lower portion "a" and the transverse walls are curved to conform to the curvature of the rollers. Two links may be assembled by flexing the wall ends so as to cause the trunnions 129 to be received in respective bores 128, articulating the links in stepped relation. Accordingly, after articulation of a pair of links such as 124 and 124', they may be pivoted with respect to each other to an angle of about 60° which forms a sufficient opening between their adjacent curved surfaces to receive a roller. When, however, such a train is assembled and applied to a shoe, the bridging members 128 and 125' are then moved into less angular relationship (FIG. 11) securing the rollers intermediate the links against loss, even though the train be removed from the shoe. Of course, it is possible to remove any roller by merely pivoting the adjacent links back to the position shown in FIG. 13.

The above described modification has an advantage in that identical links may be used. There is a further advantage in that the synthetic material of which the links may be made may have a lubricant contained as an ingredient thereof. Such lubricant, for example, can be molybdenum disulphide. Accordingly, by following the teaching of such modification, a roller train for the purpose described may be effected which requires no additional lubrication.

It will be apparent that all modifications perform the function of permitting any distance of travel of a machine table due to the continuous rotation of the roller trains around their fixed shoes. Obviously, a very long table could have considerable travel by providing a plurality of roller trains effecting support at horizontally spaced areas.

Having thus described my invention I am aware that various changes may be made without departing from the spirit thereof, and, accordingly, I do not seek to be limited to the precise illustration herein given except as set forth in the following claims.

I claim:

1. A roller train comprising a plurality of articulated links having overlapping side walls, and a roller retained intermediate said overlapping side walls at each end of said link whereby each link comprises a portion of a cage for a roller at each end thereof, said links having trunnions and aperture means at the ends thereof wherein said trunnions are carried in said apertures to articulate said links, said rollers being disposed with their axes substantially aligned with the axes of said trunnions and apertures at respective ends of said links.

2. A roller train comprising pairs of parallel axes rollers and link means effecting cages for said rollers, said link means being articulated, said link means comprising members having side walls and a bridge element extending between said side walls and integral with corresponding edges thereof, said side walls having opposite edges provided with flanges, said flanges being turned inwardly toward each other, whereby rollers are retained within the articulated link means by said bridge elements and said flanges.

3. A roller train comprising pairs of parallel axes rollers and link means effecting cages for said rollers, said link means being articulated, and means for articulating said link means comprising a roller chain having articulated links and shafts therebetween and rollers supported on said shafts, said shafts extending transversely of said chain and beyond said links and being secured to said link means for support thereof.

4. A roller train comprising a plurality of articulated links having overlapping side walls, and a roller retained intermediate said overlapping side walls at each end of said link whereby each link comprises a portion of a cage for a roller at each end thereof, said links having parallel side walls in telescoped relation, the ends of said side walls being provided with mating trunnions and apertures to articulate said links.

5. In a roller train as set forth in claim 4, each of said links having a bridge disposed between said side walls, said bridge having back-to-back arcuate surfaces conforming to the curvature of said rollers, said surfaces being disposed so that said bridge is narrowed at one portion whereby a pair of articulated links may be pivoted with respect to each other to effect an opening intermediate adjacent narrow portions of adjoining bridges sufficient for insertion of a roller and wherein said roller is retained intermediate said links by reverse pivotal movement therebetween.

6. A roller train as set forth in claim 4, said links being identical and each having a trunnion extending from a side wall at an end thereof and having an aperture in the corresponding end of the other side wall.

7. In a roller train as set forth in claim 4, said links being made of a synthetic plastic material comprising a lubricant.

8. A movable member and a roller guide therefor comprising a pair of endless rotative roller trains having straight flights in parallel relation, said member having a rail means intermediate and contiguous with adjacent flights of said trains whereby said member is supported for translational movement by rolling motion of said trains, a lower flight of one of said trains effecting retention of said rail and an upper flight of the other of said trains effecting load support for said rail, and a fixed shoe within each of said roller trains on which rollers of said trains are rotative, said shoes having parallel sides contiguous with said rollers and rounded ends for effecting ease of movement of respective roller trains in motion therearound in either direction, a machine wall, means for securing said shoes to said machine wall, and eccentric bolt means spaced from said latter means and securing at least one of said shoes to said machine wall for effecting adjustability thereof with respect to the other of said shoes.

References Cited by the Examiner

UNITED STATES PATENTS

| | | | |
|---|---|---|---|
| 1,373,386 | 3/21 | Rayfield | 74—242.16 |
| 1,669,710 | 5/28 | Jones | 59—80 |
| 2,211,881 | 8/40 | Collett et al. | |
| 2,230,442 | 2/41 | Arms. | |
| 2,620,676 | 12/52 | Raddings | 74—250 X |
| 2,785,934 | 3/57 | Alderstam et al. | |

FOREIGN PATENTS

| | | |
|---|---|---|
| 121,909 | 1/19 | Great Britain. |
| 695,195 | 8/53 | Great Britain. |

ROBERT C. RIORDON, *Primary Examiner.*

MILTON KAUFMAN, *Examiner.*